United States Patent [19]

Fischperer et al.

[11] Patent Number: 5,712,514
[45] Date of Patent: Jan. 27, 1998

[54] SYSTEM AND METHOD FOR SUPPLYING POWER TO STATOR SECTIONS OF A LONG-STATOR MAGNETIC LEVITATION RAILWAY SYSTEM

[75] Inventors: Rolf Fischperer, Berlin; Reinhard Hoffmann, Lathen, both of Germany

[73] Assignees: Siemens Aktiengesellschaft, Munich; Industrieanlagen Betriebsgesellschaft mbH, Ottobrunn, both of Germany

[21] Appl. No.: 642,745

[22] Filed: May 3, 1996

[30] Foreign Application Priority Data

May 3, 1995 [DE] Germany ............... 195 16 229.3

[51] Int. Cl.$^6$ ........................................... H02K 41/00
[52] U.S. Cl. ................... 307/69; 318/43; 318/135; 104/281; 104/290; 104/292
[58] Field of Search ................. 307/69, 43; 318/135; 104/281, 290, 292; 198/619

[56] References Cited

U.S. PATENT DOCUMENTS

| | | | |
|---|---|---|---|
| 4,068,152 | 1/1978 | Nakamura et al. | 318/135 |
| 4,303,870 | 12/1981 | Nakamura et al. | 318/135 |
| 4,348,618 | 9/1982 | Nakamura et al. | 318/38 |
| 4,361,095 | 11/1982 | Gibson | 104/292 |
| 4,721,892 | 1/1988 | Nakamura et al. | 318/38 |
| 4,955,303 | 9/1990 | Ikeda | 104/292 |
| 5,302,884 | 4/1994 | Fischperer et al. | 318/135 |

FOREIGN PATENT DOCUMENTS

| | | |
|---|---|---|
| DE 29 32 549 | 2/1980 | Germany. |
| DE 39 09 706 | 10/1989 | Germany. |
| DE 39 17 058 | 11/1990 | Germany. |
| DE 41 30 779 | 3/1993 | Germany. |
| DE 195 05 963 | 9/1995 | Germany. |

OTHER PUBLICATIONS

J. Mein, "Energieversorgung des Langstatorantriebs", etz Bd. 108, (1987), No. 9, pp.378–381.

U. Tve, "Neue Antriebskonzeption",Eisenbahntechnische Rundschau ETR, (1989), No. 3, pp.175–176.

*Primary Examiner*—William M. Shoop, Jr.
*Assistant Examiner*—Albert W. Paladini
*Attorney, Agent, or Firm*—Kenyon & Kenyon

[57] ABSTRACT

A system and method for supplying power to stator sections of a long-stator magnetic levitation railway system, where the stator winding is subdivided into several stator sections that can be controlled individually along a route for a magnetically levitated vehicle, where the stator sections can be connected to at least one feeder cable system running along the stator sections via at least one section switch, and at least one converter is provided for each feeder cable system, where one or more converters are provided in at least one substation along the stator sections, and each converter creates a voltage supply system for the stator sections, where the operating voltage in the feeder cable systems is not the same as the operating voltage of the stator sections, and at least one matching transformer is connected between the feeder cable systems and the stator sections so the operating voltage of the feeder cable systems can be transformed to the operating voltage of the stator sections.

25 Claims, 6 Drawing Sheets

SYSTEM AND METHOD FOR SUPPLYING POWER TO STATOR SECTIONS OF A LONG-STATOR MAGNETIC LEVITATION RAILWAY SYSTEM

FIELD OF THE INVENTION

The present invention relates to a system and method for supplying power to stator sections of a long-stator magnetic levitation railway system.

BACKGROUND INFORMATION

An arrangement is described, for example, in German Patent No. 39 17 058, where each feeder cable system is supplied with power by two converters (or dual feed) in order to reduce the current load on the feeder cables by one-half and to create a redundancy (for emergency operation in the event of total failure of a converter or a transformer substation). Thus, a resultant substation spacing that corresponds to the headway or distance between trains is obtained. In the substation itself, the high voltage of the electric utility company network is transformed to medium voltage and is switched to the feeder cable systems using converters with an output transformer, and ultimately is switched to the stator sections where the converters create a system with a variable frequency and a variable amplitude.

In addition, German Patent No. 39 09 706 describes another power supply system, where a supply voltage system is created with a single converter using an output transformer. Thus, the supply voltage is supplied to the feeder cable systems and ultimately to the stator sections.

As described in the article "Supplying Power to a Long-Stator Drive" in the journal "etz" vol. 108(1987), two neighboring feeder cable systems can be linked together by means of a coupling switch.

The article "New Transrapid Drive Concept" in the journal "Eisenbahntechnische Rundschau ETR" (1989) describes a method of bridging the output transformers in the range of low traveling speeds (e.g., direct feed).

FIGS. 15 to 18 of German Published Patent Application No. 41 30 779 illustrate a parallel connection of converters.

German Published Patent Application No. 195 05 963 describes a power supply system for a long-stator drive, where the stator winding is subdivided into several individually controllable stator sections along a travel route for a magnetically levitated vehicle. The stator sections can be switched to at least one feeder cable system that runs along the stator sections by means of at least one section switch. At least one converter is provided for each feeder cable system, with one or more converters in at least one substation along the stator sections. Each converter creates a voltage supply system for the stator sections, where the rated voltage in the feeder cable systems is higher than the rated voltage in the stator sections. At least one matching transformer is connected between the feeder cable systems and the stator sections to transform the rated voltage of the feeder cable systems down to match the rated voltage of the stator sections.

With the power supply system as shown in German Published Patent Application No. 195 05 963, the rated voltage in the feeder cable systems is always higher than the rated voltage of the stator sections. Therefore, a high stator current can be generated—for example, to start up the magnetically levitated vehicle—without high transmission losses. However, if the vehicle is traveling at a very high speed without accelerating, relatively little current is needed, but a much higher stator voltage is needed in comparison with the starting voltage, especially for long vehicles. To achieve such a high stator voltage with an arrangement described in German Published Patent Application No. 195 05 963, the rated voltage of the feeder cable systems must be increased even more which can only be achieved by using extensive additional technical measures or by overdimensioning the power supply system.

German Published Patent Application No. 29 32 549 describes a power supply system for a linear motor with a reactive-power compensation device that is electrically connected to the current input side of a converter (converter system) and thus to the power supply system. The reactive power at the current input side is compensated with the reactive-power compensation device, thus preventing voltage dips in the power supply network.

SUMMARY OF THE INVENTION

An object of the present invention is to create a system and method for supplying power to stator sections of a long-stator magnetic railway system that offers more design options in comparison with known arrangements and that can contribute toward optimizing the current and voltage design of the drive.

The system and method according to the present invention relates to, among other things, a high-voltage power supply. With the system and method according to the present invention, the resulting voltage drop and the power loss are lower than with a medium-voltage supply due to the higher voltage and the lower current flow at the same time. Because of the lower current flow, it is possible to reduce the number of parallel feeder cables and/or the dimensions of the individual feeder cables.

In addition, with the system and method according to the present invention, the required electric power can be transported over a greater distance, therefore permitting for greater distances between substations. Accordingly, it would not be necessary to install as many substations for a given length of track.

With the system and method according to the present invention, the dual feed may be eliminated. When the dual feed is eliminated, the problem of an unequal load distribution is also eliminated. With either a single or a dual feed, the installed substation power can be lower with the arrangement of the present invention because of a higher efficiency and a lower apparent power demand of the feeder cables.

With the system and method according to the present invention, it is possible to operate, for example, long vehicles that also require a high operating voltage due to their high internal voltage.

With the arrangement according to the present invention, the operating voltage in the feeder cable systems is not the same as the operating voltage of the stator sections (i.e., it is either higher or lower as needed). Thus, the stator current and stator voltage can be adjusted as desired. The installed power can thus be utilized optimally without having to overdimension the arrangement with regard to current or voltage.

The system is utilized optimally by a process according to the present invention, depending on the power and voltage demand of the individual stator sections.

Another embodiment according to the present invention assures that even if there is a failure of the substation that normally supplies power to a certain feeder cable system, the respective feeder cable system will be supplied with power from the substation for the adjacent feeder cable system.

Yet another embodiment according to the present invention leads to a current addition effect in an advantageous manner according to the number of feeder cable systems connected in parallel, which ensures in an advantageous manner that if one converter fails, the normally operating converter will at least partially cover the power demand of the stator sections of the long-stator drive affected by the failure.

In a further embodiment of the present invention, a switchable or controllable load with a capacitive characteristic is provided for the feeder subsections for compensation of the reactive power of magnetization of the matching transformers and stators at the stator feed points.

In contrast with the arrangement according to German Published Patent Application No. 29 32 549, the system and method according to the present invention do not have any effect on the power supply network because the converters on the power supply side and on the feeder cable side create different reactive powers independently of one another. Instead, the reactive power on the feeder side is compensated, so that unnecessary voltage losses can be prevented and thus the installed power in the converters can be utilized optimally.

DETAILED DESCRIPTION

Figure 1:
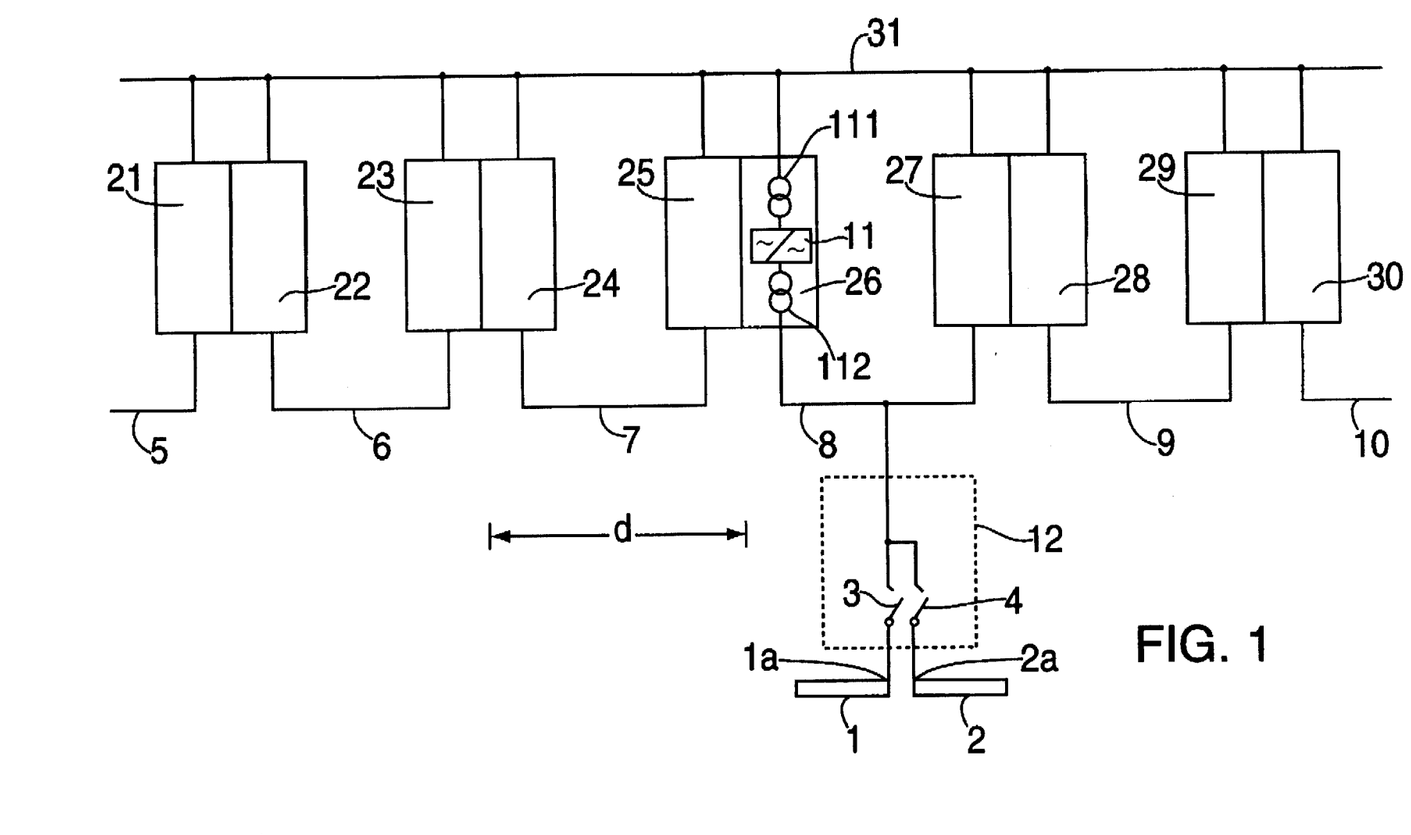
FIG. 1 shows a power supply system as described in the prior art.
Figure 2:
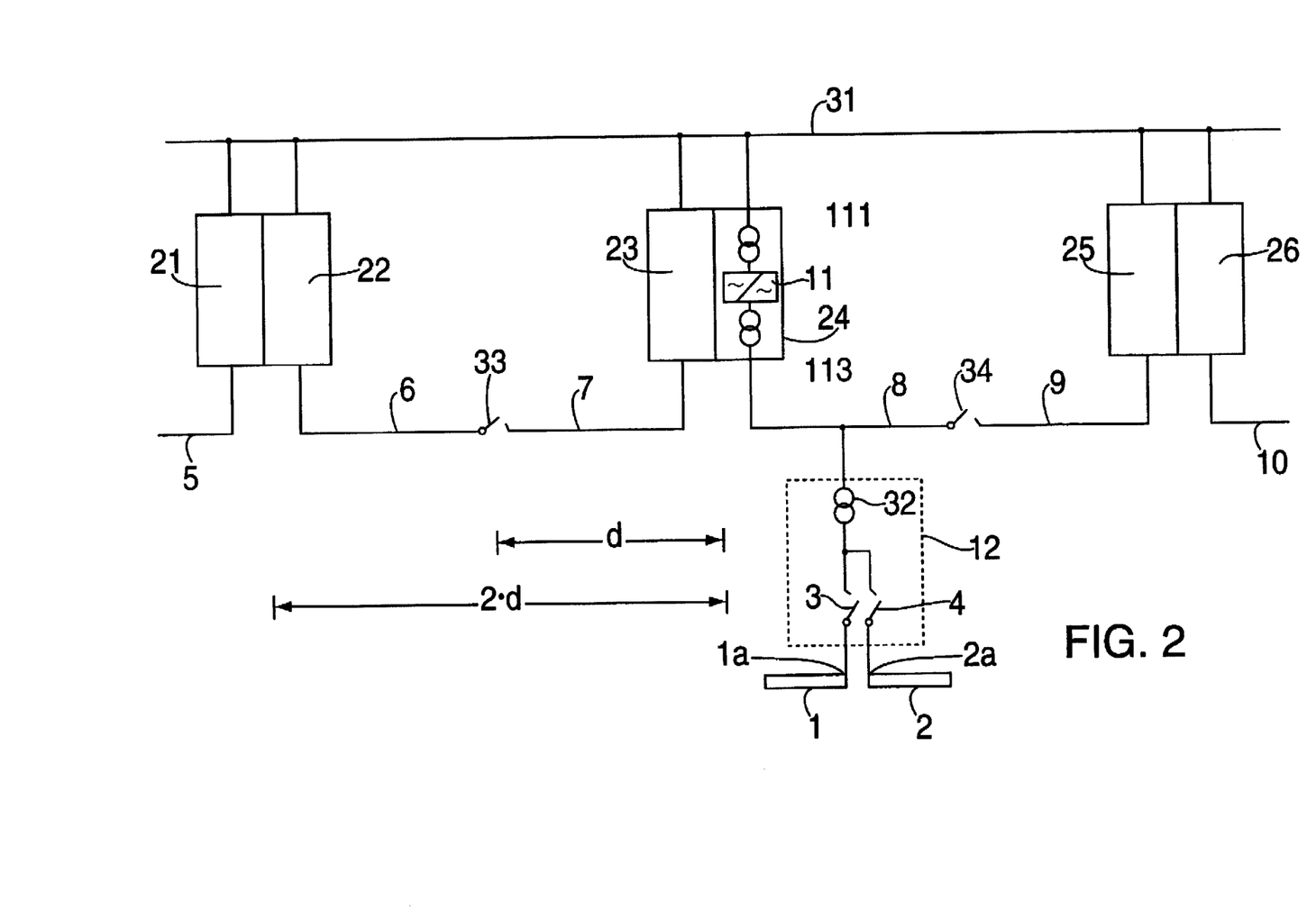
FIG. 2 shows a first embodiment of the power supply system according to the present invention.

FIGS. 1–8 are intended to depict 3-phase current systems although shown as single-phase systems. FIGS. 1 and 2 show the stator winding of a long-stator drive along a track segment for a magnetically levitated vehicle, where the stator winding is subdivided into several stator sections 1 and 2, each of which has stator infeed points 1a and 2a. Of the stator sections, which are, for example, the same length, only stator sections 1 and 2 are shown. By means of section switches 3 and 4 which are provided in switching point 12, stator sections 1 and 2 can be switched to a feeder cable system 8 running along the stator sections. Similarly, other stator sections (not shown here) can be connected to feeder cable systems 5 to 7, as well as 9 and 10. In the prior art illustrated in FIG. 1, two converters are provided per feeder cable system 5 to 10, but only one converter 11 is illustrated in FIG. 1. Each converter is located in a substation 21 to 30 along the stator sections. Thus, with the power supply system illustrated in FIG. 1, two neighboring substations in a common feeder cable system supply the power (also referred to as dual feed). This yields a distance between substations that corresponds to the distance d between trains. In substation 21 to 30 itself, the high voltage of the power supply network 31 (for example, 110 kV, 50 Hz) is transformed to medium voltage by an input transformer 111 and sent via the converters (only converter 11 is shown in FIG. 1) with output transformer 112 to the feeder cable systems 5 to 10 and finally to stator sections 1 and 2. Each converter in substations 21 to 30 creates a supply voltage system with a variable frequency and a variable amplitude. This supply voltage system is usually referred to as a medium-voltage supply system.

With the power supply system according to the present invention as illustrated in FIG. 2, each feeder cable system 5 to 10 is supplied by only one converter (also referred to as single feed). This yields a substation spacing 2d that corresponds to twice the distance between trains. Each converter (only one converter 11 is shown in FIG. 2) is set up in a substation 21 to 26 and also creates a supply voltage system with a variable frequency and a variable amplitude. The supply voltage system of the power supply system according to the present invention is referred to below as a high-voltage supply system because the supply voltage is different from that of known systems (such as those described above), and it is typically higher.

For this purpose, in the power supply system according to the present invention, the high voltage of the power supply system 31 is first transformed to a medium voltage by an input transformer 111 in each substation 21 to 26. Then a system with a variable frequency and amplitude is generated in converter 11 and then it is transformed back to high voltage by an output transformer 113.

The operating voltage in feeder cable systems 5 to 10 is different from (usually higher than) the operating voltage of stator sections 1 and 2, which are to be designed for a given operating voltage (e.g., medium-voltage system) because of the switching equipment (e.g., vacuum contactors) and the synchronous internal voltage. Therefore, a matching transformer 32 is inserted between feeder cable systems 5 to 10 and stator sections 1 and 2 so the operating voltage of feeder cable systems 5 to 10 can be transformed to the operating voltage of stator sections 1, 2.

In the present invention as illustrated in FIG. 2, two neighboring feeder cable systems 6, 7 or 8, 9 can be linked together by means of a coupling switch 33 or 34. This assures that if there is a failure in one substation, the feeder cable system affected by the outage will be supplied by the substation of the neighboring feeder cable system.

Figure 3:
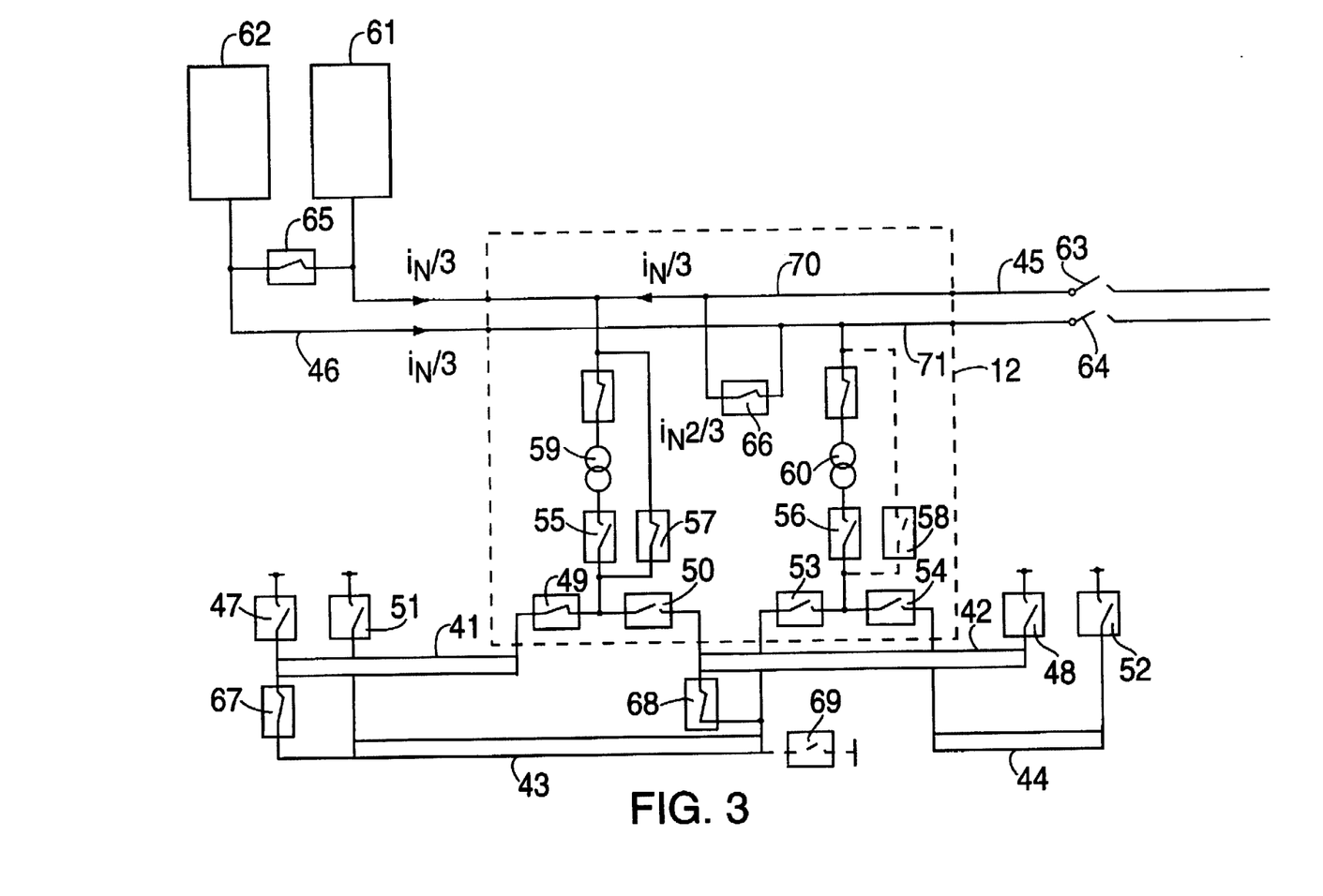
FIG. 3 shows a second embodiment of the power supply system according to the present invention in start operation.
Figure 4:
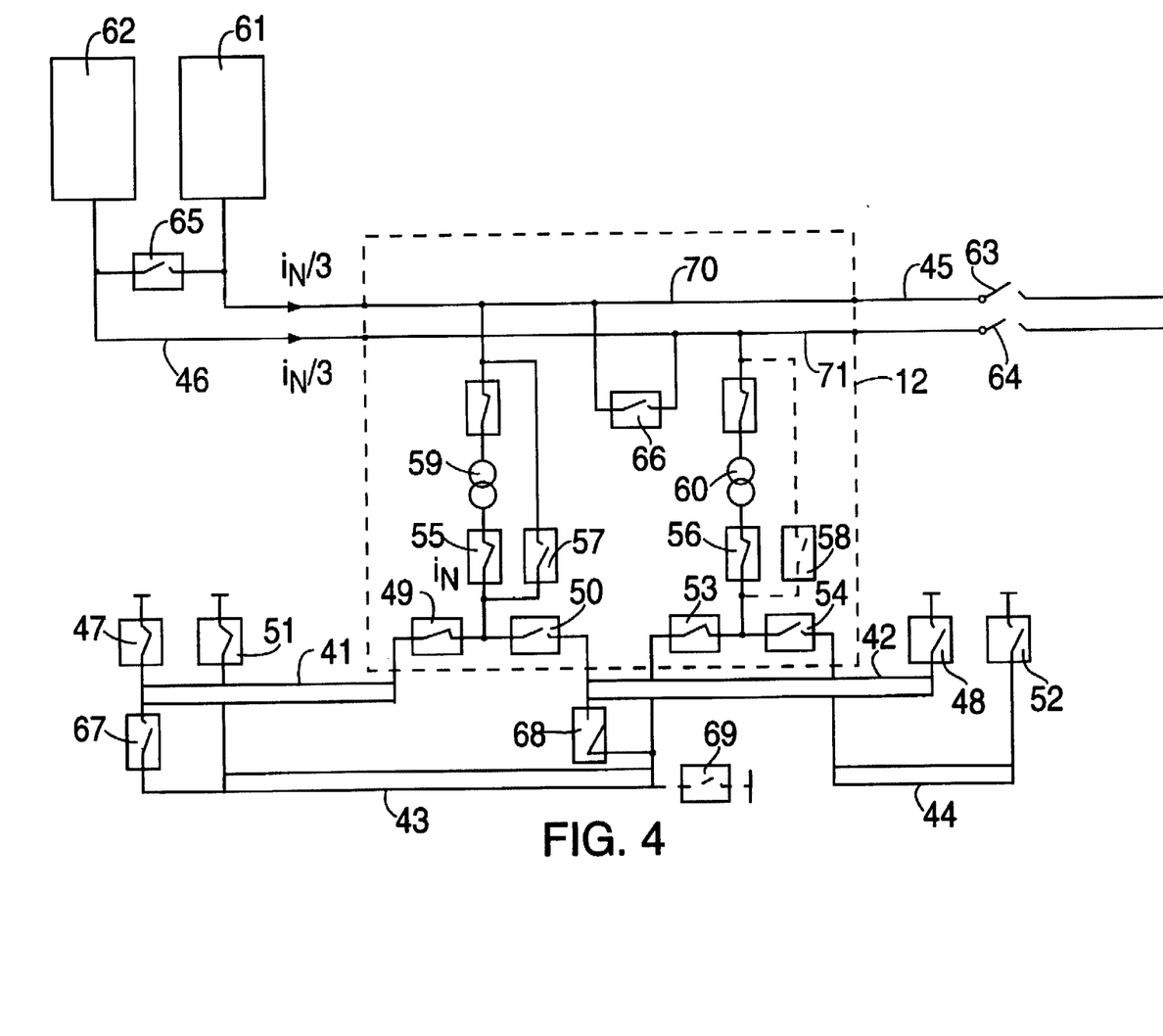
FIG. 4 shows the power supply system according to the present invention as illustrated FIG. 3 in normal operation.

FIGS. 3 and 4 show two long-stator drives arranged in parallel to the drive for a single magnetically levitated vehicle. The stator winding of each long-stator drive is subdivided along the route of the magnetically levitated vehicle into several stator sections 41 to 44 that can be controlled individually.

Two stator sections 41, 42 or 43, 44 can be connected to a conductor rail 70 or 71, which is connected electrically to a feeder cable system 45 or 46. Stator sections 41 and 42 are therefore connected at one end to a star point switch 47 or 48 and at the other end to an incoming feeder circuit-breaker 49 or 50. Similarly, stator sections 43 and 44 are each connected to a star point switch 51 or 52 as well as an incoming feeder circuit-breaker 53 or 54. In the closed position, star point switches 47 and 48 as well as star point switches 51 and 52 each form a star point (e.g., a neutral point). Incoming feeder circuit-breakers 49 and 50 can be switched to conductor rail 70 by a section switch 55, whereas incoming feeder circuit-breakers 53 and 54 can be switched to conductor rail 71 by a section switch 56.

Matching transformers 59 and 60 are connected in series with section switches 55 and 56, respectively, so the rated voltage of feeder cable systems 45 and 46 can be transformed to the rated voltage of stator sections 41 to 44. Thus, in this example, a common matching transformer 59 or 60 is provided for two stator sections 41, 42 or 43, 44.

Feeder cable systems 45 and 46 are supplied by a converter 61 or 62 (including output transformers not shown here) with a variable frequency and variable amplitude supply voltage, and in the event of a problem, they can be switched to the neighboring feeder cable system (not shown in FIGS. 3 and 4) by means of coupling switch 63 or 64.

In addition, in the embodiment of the present invention shown in FIGS. 3 and 4, two switches 65 and 66 connected in parallel are also provided. Parallel-connected switch 65 is connected at one end to feeder cable system 45 and at the other end to feeder cable system 46. Parallel-connected switch 66 is connected to conductor rail 70 at one end and to conductor rail 71 at the other end.

Furthermore, stator sections 41 and 43 are joined together by a cross-connected switch 67 at their neutral ends. In addition, stator sections 42 and 43 are joined together by a cross-connected switch 68 at their input ends. Instead of the latter connection, stator section 43 may be connected to an additional star point switch 69 at the input end.

To start up the magnetically levitated vehicle, section switches 55 and 56 are opened and bridging switch 57 is closed. This bridges the matching transformer 59. Bridging switch 58 remains open.

If the operating voltage of the feeder cable is significantly higher in transformer operation than the operating voltage of the stator, the feeder cable systems 45 and 46 are also connected in parallel by closing the parallel-connected switch 66 (and parallel-connected switch 65, if necessary).

At the same time, star point switch 48, incoming feeder circuit-breaker 49 and cross-connected switches 67 and 68 are closed. If a star point switch 69 is provided as an alternative to cross-connected switch 68, it is also closed. All the other switches are opened. Stator sections 41 to 43 are thus connected in series.

The rated currents $i_N$ of the feeder cable systems are added together due to the fact that feeder cable systems 45 and 46 are connected in parallel while stator sections 41 to 44 are connected in series at the same time.

At an operating voltage of 30 kV in each of the feeder cable systems 45 and 46 and an operating voltage of 10 kV in stator sections 41 and 42 as well as in stator sections 43 and 44, a nominal current of $i_N/3$ flows in each of the two feeder cable systems due to the high-voltage-to-medium-voltage transformation ratio. As a result of the switching operations as described above, two-thirds of the rated current $i_N$ is available in start operation (shown in FIG. 3). For the start period, the overload operation is also conceivable with regard to the feeder cables, so that the full rated current $i_N$ is available. In order to transfer from the start operation (shown in FIG. 3) to the normal operation (shown in FIG. 4), bridging switch 57, parallel-connected switches 65, 66 and cross-connected switches 67, 68 (or cross-connected switch 67 and star point switch 69) are opened. In addition, incoming feeder circuit-breaker 53 and section switches 55, 56 must also be closed.

Conductor rails 70 and 71 can be accommodated together with the switch elements on the railway side at common switching point 12 in an advantageous manner.

Figure 5:
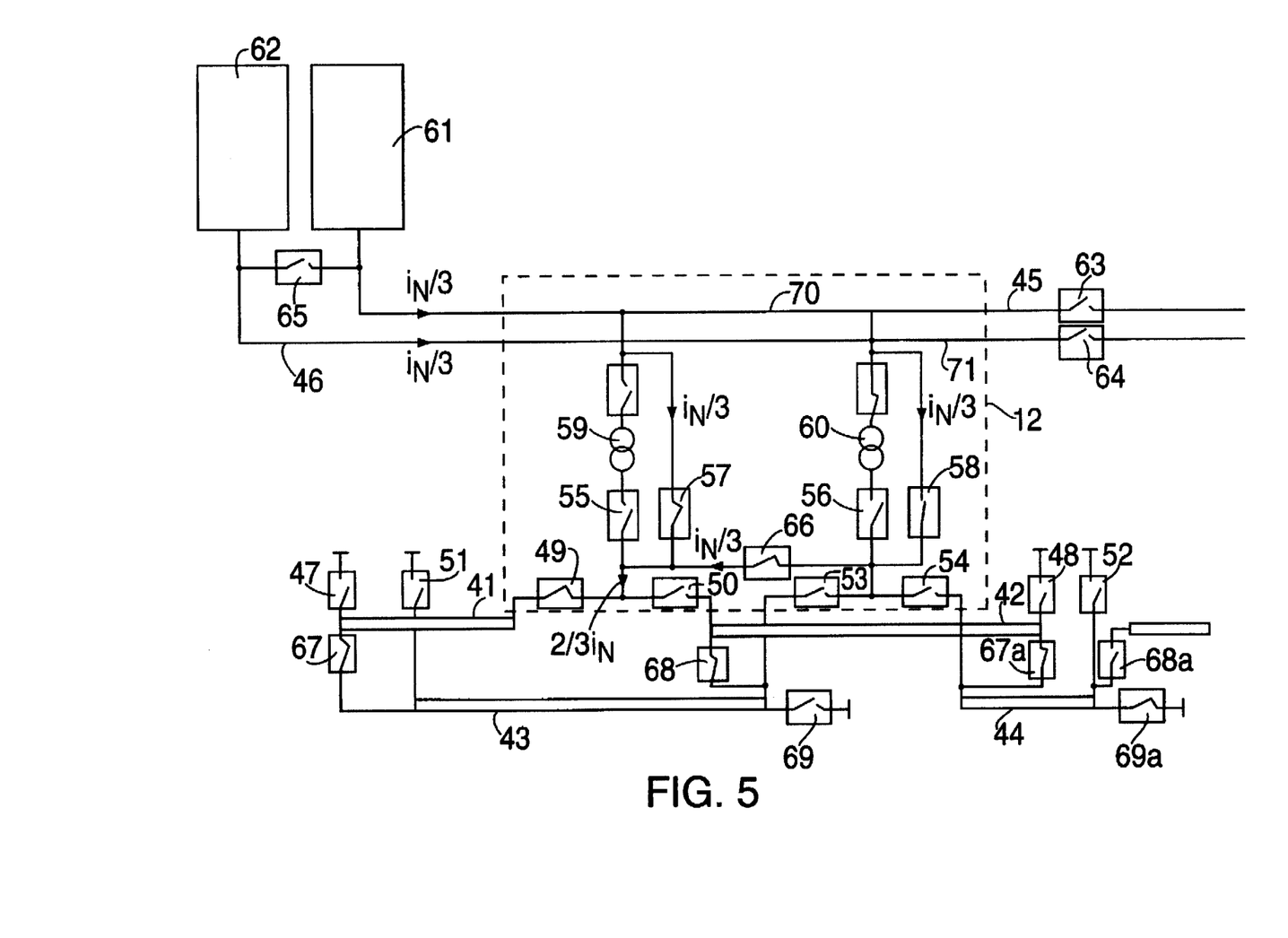
FIG. 5 shows a modification of the power supply system according to FIG. 3.

The design of the power supply system according to the present invention as illustrated in FIG. 5 differs from the embodiment according to the present invention as shown in FIG. 3 in that switch 66 has been shifted from the feeder cable side (usually high voltage) to the stator side (usually medium voltage). In addition, FIG. 5 also shows that the series connection of stator sections can be spatially expanded by additional cross-connected switches 67a and 68a and by another star point switch 69a. Switches 67a to 69a are arranged like switches 67 to 69.

Figure 6:
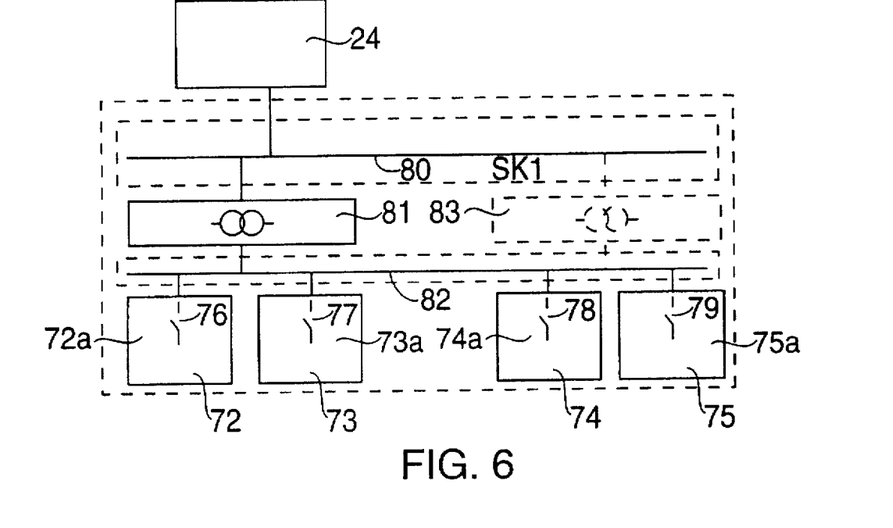
FIG. 6 shows a fourth embodiment of the power supply system according to the present invention.

In the embodiment according to the present invention illustrated in FIG. 6, the stator winding of a long-stator drive is subdivided along a route for a magnetically levitated vehicle into several stator sections 72 to 75, each having a stator feed point 72a to 75a. Stator sections 72 to 75 can each be connected to a feeder cable system 80 that runs along the stator sections by a section switch 76 to 79. A matching transformer 81 is connected between feeder cable system 80 and stator sections 72 to 75 to transform the operating voltage of feeder cable system 80 to the operating voltage of stator sections 72 to 75. Matching transformer 81 is connected not only to nearby stator sections 72 and 73 but also to remote stator sections 74 and 75 via a separate transmission system 82. Matching transformer 83 which is shown with a dotted line can thus be eliminated.

Figure 7:
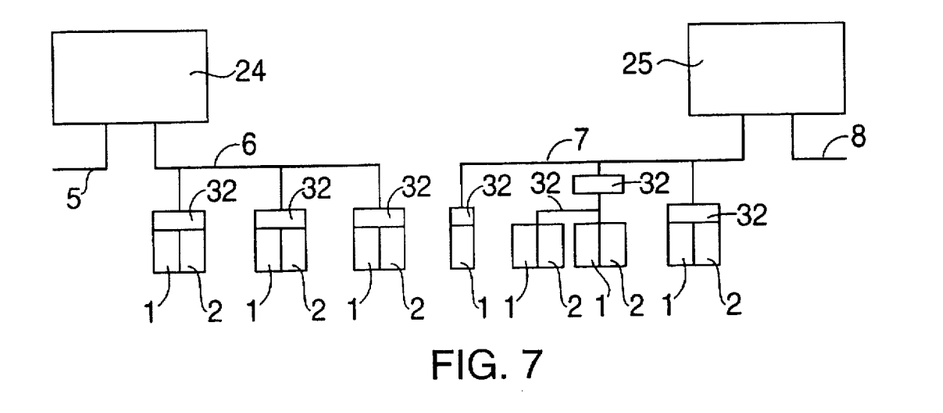
FIG. 7 shows a fifth embodiment of the power supply system according to the present invention.

FIG. 7 shows an arrangement according to the present invention where stator sections 1,2, which are connected to feeder cable system 6, are connected by pairs to a matching transformer 32, and the stator sections that are connected to feeder cable system 7 are connected to matching transformer 32 either individually (stator section 1) or in pairs (stator sections 1, 2) or via a separate transmission system 82.

Figure 8:
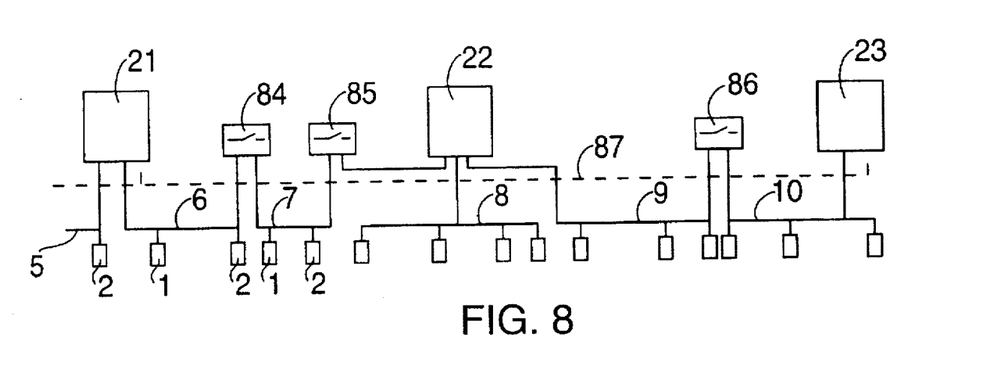
FIG. 8 shows a sixth embodiment of the power supply system according to the present invention.

FIG. 8 shows an arrangement according to the present invention in which a distinction is made between various feeder cable systems 5 to 10 that are connected to substations 21 to 23. Feeder cable system 5, as well as feeder systems 8 and 10, are connected directly to the respective substations 21, 22 and 23. Feeder cable system 9 is connected to substation 22 via a separate transmission system (additional feeder cable system). Feeder cable system 7 is connected to converter 22 via a coupling point 85 and separate lines. In addition, feeder cable system 7 and feeder cable system 9 are connected to the respective substations 21 and 23 via coupling points 84 and 86, respectively. Furthermore, substations 21 to 23 are linked together via network distribution 87 so that only one of the substations need be connected to a power supply network.

In addition, the switches illustrated herein may be implemented according to any applicable technology (e.g., as isolators, circuit-breakers or vacuum contactors).

What is claimed is:

1. A system for supplying power to a long-stator magnetic drive, the system comprising:
 a) a plurality of stator sections arranged along a route for a magnetically levitated vehicle and having a stator section operating voltage, each stator section being individually controllable and including at least one stator feed point;
 b) at least one feeder cable system having a feeder cable operating voltage, the feeder cable operating voltage being different from the stator section operating voltage;
 c) at least one converter, corresponding to the at least one feeder cable system, said at least one converter being arranged along the plurality of stator sections in at least one substation;
 d) a power supply network coupled to said at least one converter via an input transformer, said at least one converter being coupled to an output transformer for providing a voltage supply for the plurality of stator sections; and
 e) at least one matching transformer coupled between the at least one feeder cable system and the plurality of stator sections, wherein the at least one matching transformer transforms the feeder cable operating voltage to match the stator section operating voltage.

2. The system according to claim 1, wherein the at least one feeder cable system is arranged along the plurality of stator sections, each of the plurality of stator sections including at least one section switch for coupling with the at least one feeder cable system.

3. The system according to claim 1, wherein at least one of the feeder cable systems includes a coupling switch for connecting one of the at least one feeder cable systems with an adjacent one of the at least one feeder cable systems.

4. The system according to claim 1, wherein each of the at least one matching transformers includes a bridging switch, the bridging switch providing a startup direct current to the plurality of stator sections.

5. The system according to claim 4, further comprising another magnetic drive arranged in parallel to the long stator magnetic drive, wherein the feeder cable systems of the two magnetic drives are coupled in parallel and the corresponding stator sections are coupled in series.

6. The system according to claim 5, further comprising at least one switching device for coupling, in parallel, the at least one converter of one of the magnetic drives with the at least one converter of the other magnetic drive for synchronously supplying power to at least two feeder cable systems at the same time.

7. The system according to claim 1, wherein the at least one stator feed point is coupled to an output of the at least onesubstation via high-voltage cables.

8. The system according to claim 1, wherein the at least one stator feed point is coupled to an output of the substation via overhead lines.

9. The system according to claim 1, wherein the at least one stator feed point includes two substantially adjacent stator feed points, and wherein the substantially adjacent stator feed points are supplied with power via a shared matching transformer.

10. The system according to claim 9, further comprising a transmission system coupling at least two of the plurality of stator sections for providing power to at least three stator feed points using the shared matching transformer.

11. The system according to claim 1, wherein the at least one feeder cable system includes two feeder subsections for coupling two substations, the at least one feeder cable system coupling one of the at least one substation to one of the two feeder subsections and providing coupling points between two feeder subsections.

12. The system according to claim 11, comprising a separate feeder cable connection between the substations to supply power to the feeder substations.

13. The system according to claim 6, wherein the at least one matching transformer is coupled to the at least one stator feed point with at least one disconnector.

14. The system according to claim 1, wherein a controllable capacitive load is provided for the feeder subsections, the controllable capacitive load compensating for a reactive power of magnetization of the at least one matching transformer and the at least one of the plurality of stator sections.

15. A method for supplying power to a long-stator magnetic drive, the method comprising the steps of:
a) generating a stator section operating voltage at a plurality of stator sections, each stator section being individually controllable and having at least one stator feed point, the stator sections being arranged along a route of a magnetically levitated vehicle;
b) generating a feeder cable operating voltage with at least one feeder cable system, the feeder cable operating voltage being different from the stator section operating voltage;
c) providing at least one converter, corresponding to the at least one feeder cable systems, said at least one converter being arranged along the stator sections in at least one substation;
d) providing a voltage supply system for the at least one stator section by coupling a power supply network said at least one converter via an input transformer, the voltage supply system coupled to an output transformer;

e) coupling at least one matching transformer between the at least one stator section and the plurality of stator sections; and
f) transforming the feeder cable operating voltage to match the stator section operating voltage.

16. The method according to claim 15, wherein the voltage supply system provides a transmission voltage between the at least one substation and the stator sections, the transmission voltage being higher than the stator section operating voltage.

17. The method according to claim 15, wherein the voltage supply system provides a transmission voltage between the at least one substation and the stator sections, the transmission voltage being lower than the stator section operating voltage.

18. The method according to claims 16, further comprising the step of:
g) providing at least one coupling switch, the coupling switch connecting one of the feeder cable systems to an adjacent one of the feeder cable systems by closing the at least one coupling switch.

19. The method according to claims 17, further comprising the step of:
g) providing at least one coupling switch, the coupling switch connecting one of the feeder cable systems to an adjacent one of the feeder cable systems by closing the at least one coupling switch.

20. The method according to claims 16, wherein one of the matching transformers is arranged on a transmitting section of the stator sections, the magnetically levitated vehicle positioned in a proximity of the transmitting section, one of the matching transformers positioned on the transmitting section being bridged for starting up the magnetically levitated vehicle.

21. The method according to claims 17, wherein one of the matching transformers is arranged on a transmitting section of the stator sections, the magnetically levitated vehicle positioned in a proximity of the transmitting section, one of the matching transformers positioned on the transmitting section being bridged for starting up the magnetically levitated vehicle.

22. The method according to claim 20, further comprising the step of:
h) arranging another magnetic drive in parallel with the long statormagnetic drive, wherein the feeder cable systems of the two drives are coupled in parallel and the corresponding stator sections are coupled in series.

23. The method according to claim 21, further comprising the step of:
h) arranging another magnetic drive in parallel with the long stator magnetic drive, wherein the feeder cable systems of the two drives are coupled in parallel and the corresponding stator sections are coupled in series.

24. The method according to claim 22, further comprising the step of:
i) providing at least one switching device for coupling, in parallel, the at least one converter of one of the long-stator drives with the at least one converter of the other longstator drive for synchronously supplying power to at least two feeder cable systems at the same time.

25. The method according to claim 23, further comprising the step of:
i) providing at least one switching device for coupling, in parallel, the at least one converter of one of the long-stator drives with the at least one converter of the other long-stator drive for synchronously supplying power to at least two feeder cable systems at the same time.

* * * * *